United States Patent [19]

Robinson et al.

[11] Patent Number: 5,279,693
[45] Date of Patent: Jan. 18, 1994

[54] WELDING THERMOPLASTIC MATERIAL WITH A LASER

[75] Inventors: John P. Robinson, Clifton; William R. Stadick, North Brunswick; Thomas L. Clawges, Spotswood; John A. Zuvich, Newark; Daniel Trigger, Parsippany, all of N.J.

[73] Assignee: LPS Industries, Inc., Newark, N.J.

[21] Appl. No.: 921,383

[22] Filed: Jul. 30, 1992

Related U.S. Application Data

[63] Continuation of Ser. No. 521,037, May 9, 1990, abandoned.

[51] Int. Cl.$^5$ ...................... B32B 31/00; B23K 26/06
[52] U.S. Cl. .................. 156/272.8; 156/308.2; 156/324; 383/63; 219/121.64; 219/121.75; 219/121.76
[58] Field of Search ............ 219/121.75, 121.63, 219/121.64; 156/272.8, 275.1, 308.2, 308.4, 324, 379.6, 379.8, 379.9, 380.9; 383/63, 65

[56] References Cited

U.S. PATENT DOCUMENTS

| 3,362,866 | 1/1968 | Zahn | 156/324 X |
|---|---|---|---|
| 3,364,091 | 1/1968 | Conti | 156/324 X |
| 3,560,291 | 2/1971 | Foglia et al. | 156/229 |
| 3,769,117 | 10/1973 | Bowen et al. | 156/69 |
| 3,948,705 | 4/1976 | Ausnit | 156/308.2 X |
| 3,989,778 | 11/1976 | Osborne | 156/275.1 X |
| 4,069,080 | 1/1978 | Osborne | 156/272 |
| 4,430,070 | 2/1984 | Ausnit | 493/215 |
| 4,636,609 | 1/1987 | Nakamata | 219/121.64 |
| 4,709,533 | 12/1987 | Ausnit | 383/63 X |
| 4,817,188 | 3/1989 | Van Erden | 383/63 |
| 4,832,505 | 5/1989 | Ausnit et al. | 383/63 |
| 4,914,272 | 4/1990 | Ito et al. | 219/121.63 |
| 4,990,741 | 2/1991 | Moores et al. | 219/121.75 X |
| 5,004,356 | 4/1991 | Matsui | 383/63 |
| 5,103,074 | 4/1992 | Watanabe et al. | 219/121.75 X |

OTHER PUBLICATIONS

*Handbook of Common Polymers*, CRC Press, 1973, pp. 25, 51.

Webster's II New Riverside Dictionary, Riverside Publishing, 1984, p. 425.

Primary Examiner—David A. Simmons
Assistant Examiner—Chester T. Barry
Attorney, Agent, or Firm—Fitzpatrick, Cella, Harper & Scinto

[57] ABSTRACT

An apparatus for forming a weld between first and second thermoplastic materials in which the softening temperature of the second thermoplastic material is lower than that of the first thermoplastic material. The apparatus includes a supplier for supplying the first thermoplastic material and the second thermoplastic material to the same weld position with the second thermoplastic material at a first side of the first thermoplastic material, and a projector for projecting a laser beam to the weld position from a second side of the first thermoplastic material.

9 Claims, 7 Drawing Sheets

WELDING THERMOPLASTIC MATERIAL WITH A LASER

This application is a continuation of application Ser. No. 07/521,037, filed May 9, 1990, now abandoned.

BACKGROUND

1. Field of the Invention

The present invention pertains to an apparatus for welding thermoplastic material with a laser. More particularly, the apparatus is for affixing an interlocking fastener at a predesignated position (for example, at the open end or folded end of a folded, extruded thermoplastic material, or between two separate sheets of thermoplastic material) in the manufacture of a resealable plastic bag.

2. Description of the Related Art

To fabricate products from sheets of thermoplastic material, it is often necessary to seal the thermoplastic material to itself or to similar material. Such materials are heat fusible, and it is therefore possible to form the seals (or welds) by the application of thermal energy.

As is known, the temperature to which the thermoplastic sheet is raised to form the weld must be carefully controlled. If the temperature is raised too far, the thermoplastic material melts and simply separates. On the other hand, if the temperature is not raised far enough, no weld is formed. Therefore, in forming a weld, it is necessary to raise the temperature of the thermoplastic material to a point between its softening temperature and the melting point thereof.

Conventional techniques for raising the temperature include steps such as mechanically pressing two sheets of thermoplastic film together between heated sealing bars, applying radio-frequency or ultrasonic energy, or applying heated compressed air blown through opposed nozzles to seal the material together. Such techniques, however, have significant drawbacks, primarily in the speed at which the thermoplastic material may be welded.

In view of this shortcoming, it has been recognized to use a laser to form a weld in sheets of thermoplastic material. For example, U.S. Pat. Nos. 3,560,291 and 3,769,117 describe bonding of thermoplastic resin films using radiation from a laser source by focusing the laser beam to a point and scanning or moving the laser beam relative to the thermoplastic material. Additionally, U.S. Pat. No. 4,069,080 describes welding thermoplastic sheets together by focusing a laser beam into a line, thereby eliminating the need for relative movement between the laser beam and the thermoplastic sheet.

While these patents describe systems which are advantageous from the perspective of utilizing a laser beam to form the weld rather than mechanical heating means, the state of the art is still not acceptable.

For example, the welds formed by such systems are often incomplete due to various combinations of improper registration between the sheets, improper coordination of laser power, improper conveying speed of the sheet, and incorrect sealing pressure. Incomplete welds (sometimes called "peel welds") are also caused by absorption of the laser power by the first layer of thermoplastic material, thereby reducing the amount of laser power available to heat the second layer of plastic material. This problem is particularly acute in devices where more than two layers of thermoplastic material must be welded, thereby precluding the simple solution of projecting laser power from both sides of the weld. Furthermore, incomplete welds may be caused by an improper distribution of the laser power within the profile of the layers of thermoplastic material.

SUMMARY OF THE INVENTION

It is therefore an object of the present invention to avoid these and other difficulties found in prior art methods and devices.

It is a further object of the present invention to provide a method and apparatus for reliably forming welds on thermoplastic material using a laser beam as the radiant energy source.

It is a further object of the present invention to provide a method and apparatus for forming welds on a multilayer structure of thermoplastic materials having dissimilar properties using a laser beam. In particular, it is an object to form a plurality of independent welds in such a multilayer structure, for example, a structure comprising, in order, a thermoplastic sheet, a pair of interlocking zipper strips, and a final thermoplastic sheet. In this case, the independent welds would be formed between each thermoplastic sheet and its adjacent half of the interlocking zipper strip.

These and other objects of the invention are obtained by the provision of a sheet welding device having supply means for supplying both a first thermoplastic material to a weld station wherein the first material has a first softening temperature, and for supplying a second thermoplastic material to the weld station at a first side of the first thermoplastic material wherein the second thermoplastic material has a second softening temperature that is lower than the first softening temperature; and means for projecting a laser beam to the weld station from a second side of said first thermoplastic material. Multiple weld stations may be provided to form welds at different locations spaced both laterally and longitudinally of the thermoplastic material.

BRIEF DESCRIPTION OF THE DRAWINGS

FIG. 1, comprising FIGS. 1A, 1B and 1C, is a schematic elevational view of an embodiment of the present invention;

FIG. 2A is a perspective view.

DETAILED DESCRIPTION OF THE PREFERRED EMBODIMENT

The present invention will be described with reference to an embodiment of the invention adapted to fabricate a web for use in manufacturing resealable plastic bags having an interlocking zipper strip at a predesignated position thereon. For example, if the web is in the form of a folded thermoplastic sheet, the predesignated position may be at the open end or the folded end of the sheet. The web may also be in the form of two independent sheets.

Figure 2A:
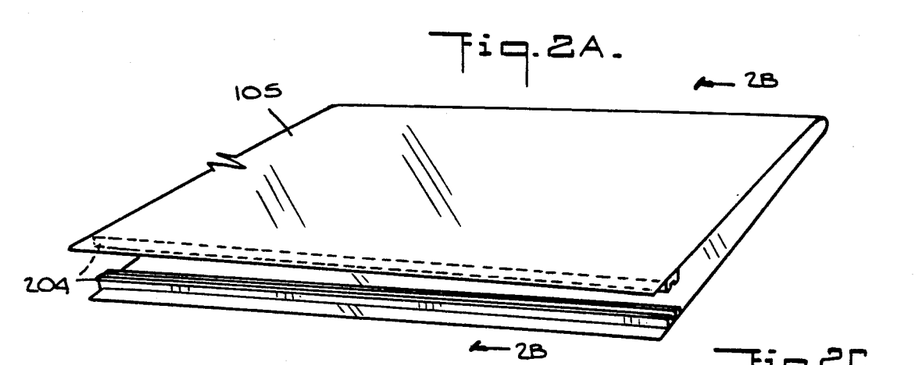

The present description will be given with respect to a fabricated web in the form of a continuous length of folded thermoplastic sheet material having an interlocking zipper strip fixed proximate the open end thereof. Such a fabricated web is shown schematically in FIGS. 2A, 2B and 2C. From these figures, it will be evident that two independent welds must be formed: a first weld between the first leg of the folded sheet and the first half of the interlocking fastener, and a second weld between the second leg of the folded sheet and the second half of the interlocking fastener.

Figures 1, 1A:
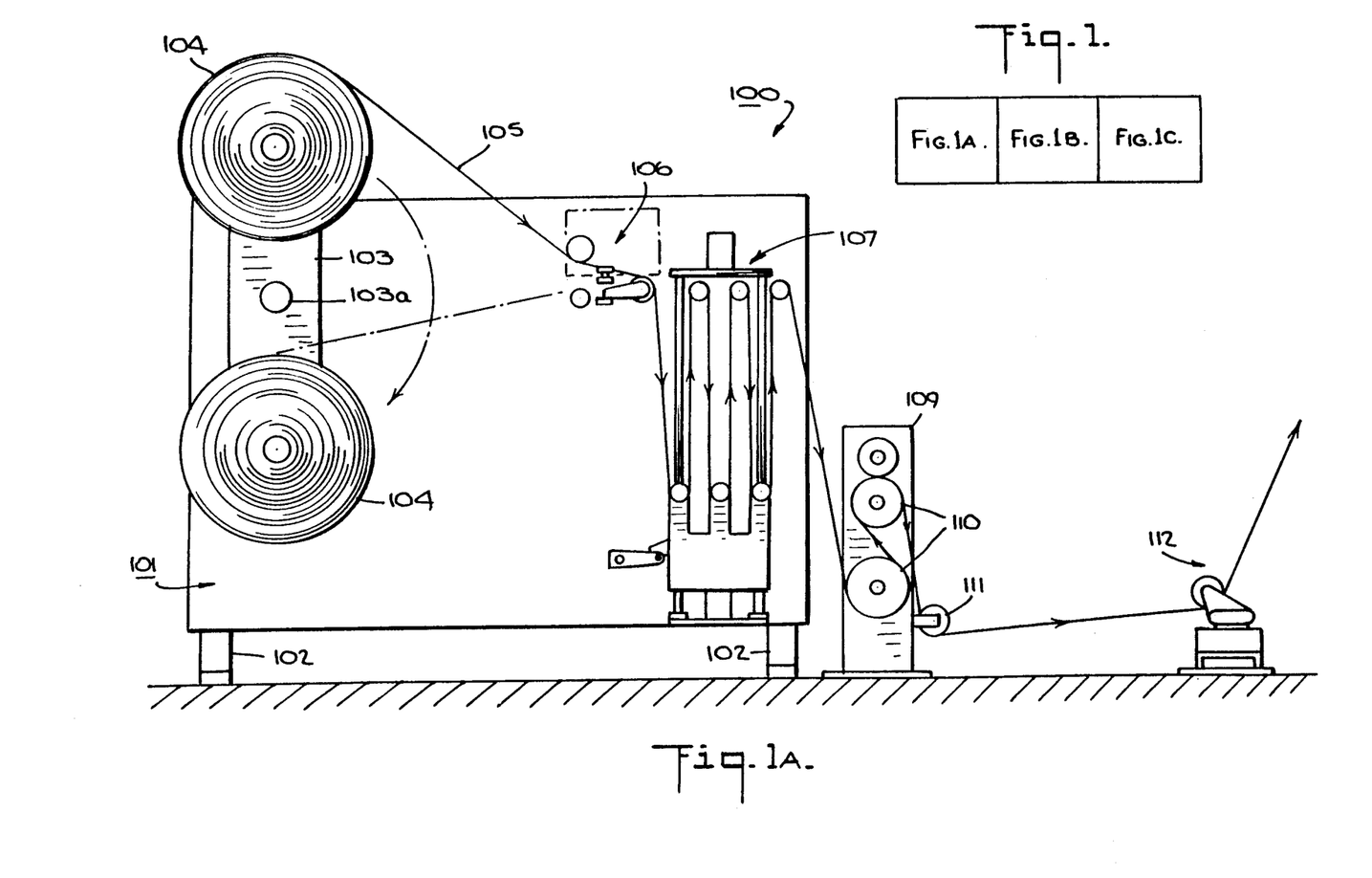

A suitable apparatus for forming such a fabricated web is shown in FIG. 1.

FIG. 1 is an elevational view of a preferred embodiment of an apparatus according to the present invention. The various assemblies shown in the apparatus of FIG. 1 may broadly be classified into the feed assembly 100, the main frame 200 including welding section 300, and rewind assembly 400. Each assembly is described below.

The Feed Assembly

The feed assembly 100 is comprised by housing 101 supported at a fixed location by legs 102. The housing includes a pair of supply rollers 104 for supplying thermoplastic material to the apparatus. While two supply rollers 104 are shown, only a single supply roller is used at any one time. The additional supply roller is provided to expedite the changing of supply rollers when the first supply roller has been depleted. If desired, the two rollers may be mounted on a single shaft 103 pivotable about axis 103a so as to simplify changing the rollers.

The thermoplastic material 105 on supply roller 104 is in the form of a folded sheet of material. More specifically, the material wound onto supply roller 104 is in the form of a continuous length of thermoplastic sheet that has been folded into a U-shape, so that as the material unwinds from the roller, one lateral edge of the sheet is closed and the opposite lateral edge is open.

As will be evident to those skilled in the art, other means may be employed to supply thermoplastic material 105. For example, the folded thermoplastic material may be formed by drawing a single sheet of material over a Vee-board, or a pair of separate sheets may be supplied. The source of these materials may be the supply roller 104 discussed above, or an in-line extruder.

The thermoplastic material 105 led from the appropriate supply roller 104 is fed past guide roller triplet 106 which serves to accept the thermoplastic material from any possible position of the supply rollers and to direct the thermoplastic material toward dancer rollers 107. Dancer rollers 107 are movable vertically to absorb any sudden motions in the speed at which the thermoplastic material is supplied to the apparatus. Thus, the dancer rollers assure a smooth, continuous supply of thermoplastic material to main frame 200.

The thermoplastic material is led from housing 101 to tensioner 109. As shown in FIG. 1, the thermoplastic material is wrapped in an S-shaped fashion around three rollers in the tensioner. This configuration ensures that proper tension may be maintained on the thermoplastic during the welding process. To this end, the rollers in tensioner 109 are coated with a roughened material to ensure that they exert a gripping force on the thermoplastic material.

The lower rollers 110 in tensioner 109 are driven rollers. These rollers are driven in correspondence to master drive roller 210 in main frame 200 in a manner to be described below.

Figures 2B, 2C, 3:
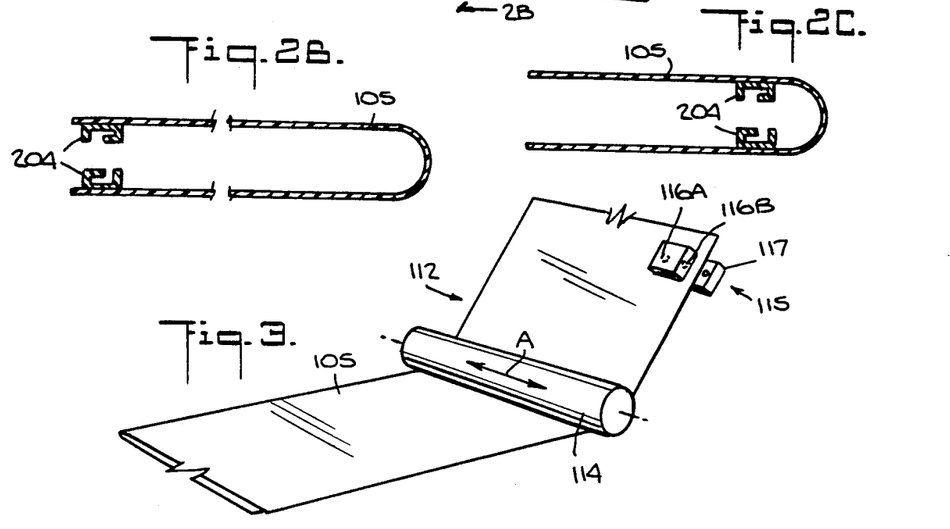
FIGS. 2B and 2C are cross-sectional views of a fabricated web formed by the embodiment of FIG. 1.
FIG. 3 is a detailed view of a lateral adjustment device used in the FIG. 1 embodiment.

After exiting tensioner 109, thermoplastic material 105 is led via roller 111 to lateral adjuster 112. The lateral adjuster, as shown in FIG. 3, includes roller 114 which is movable in a lateral direction as indicated by double-headed arrow A. The lateral position of roller 114 is controlled in accordance with position detector 115. Position detector 115 is of the type which provides two jets of air through ports 116A and 116B from unshown air supply lines. The jets of air are detected by a pair of corresponding sensors (not shown) on plate 117. The lateral position of roller 114 is adjusted so that thermoplastic material 105 blocks the jet of air from port 116A, and allows the jet of air to flow freely from port 116B to its corresponding sensor. In this way, the position of one edge of the folded thermoplastic sheet is precisely adjusted.

Folded thermoplastic material 105, whose lateral position has been appropriately adjusted by lateral adjuster 112 and whose tension has been set by tensioner 109 is then fed to main frame 200.

Main Frame

In main frame 200, zipper strip 204 is introduced between the legs of U-shaped folded thermoplastic material 105, and the zipper strip is welded to adjacent legs of the folded thermoplastic material.

Figure 1B:
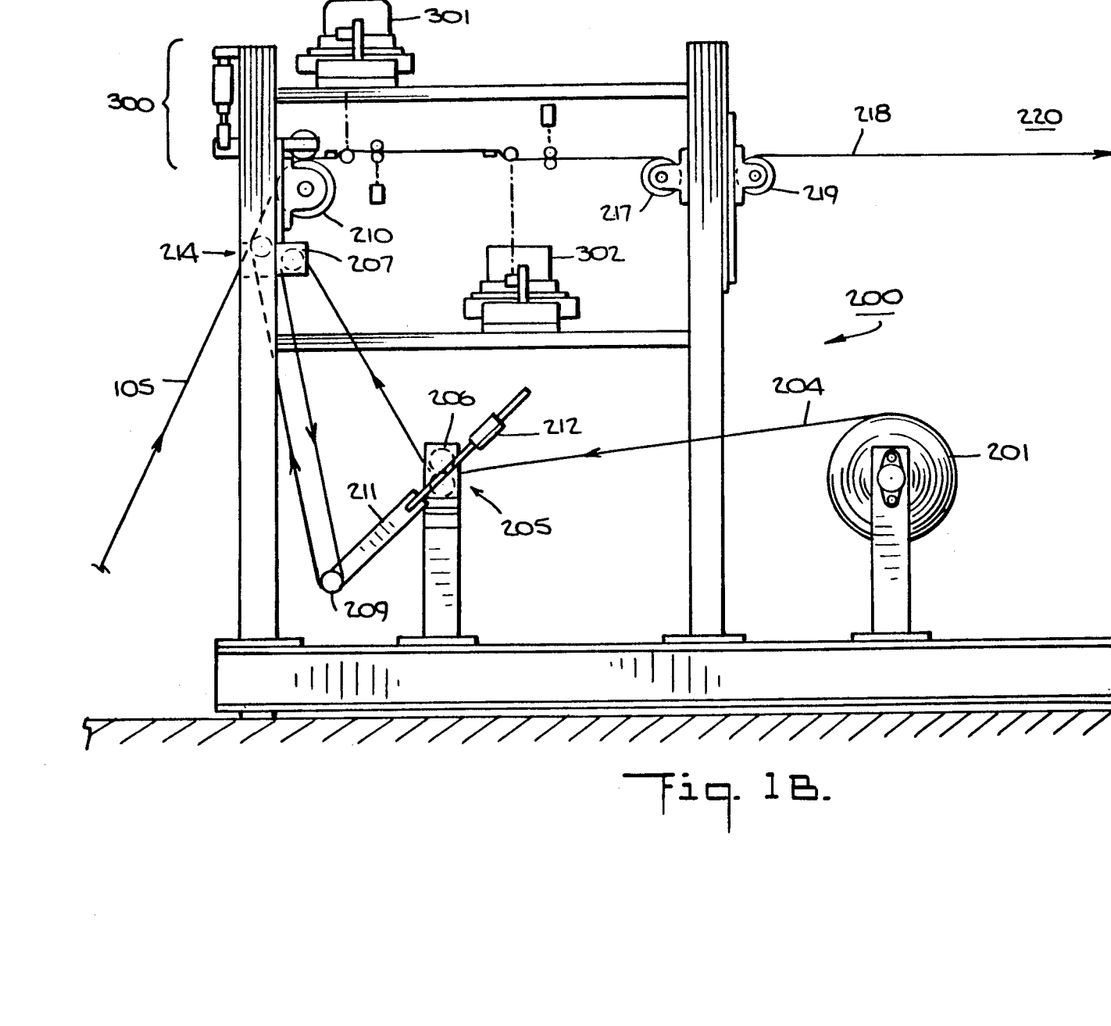
Figure 1C:
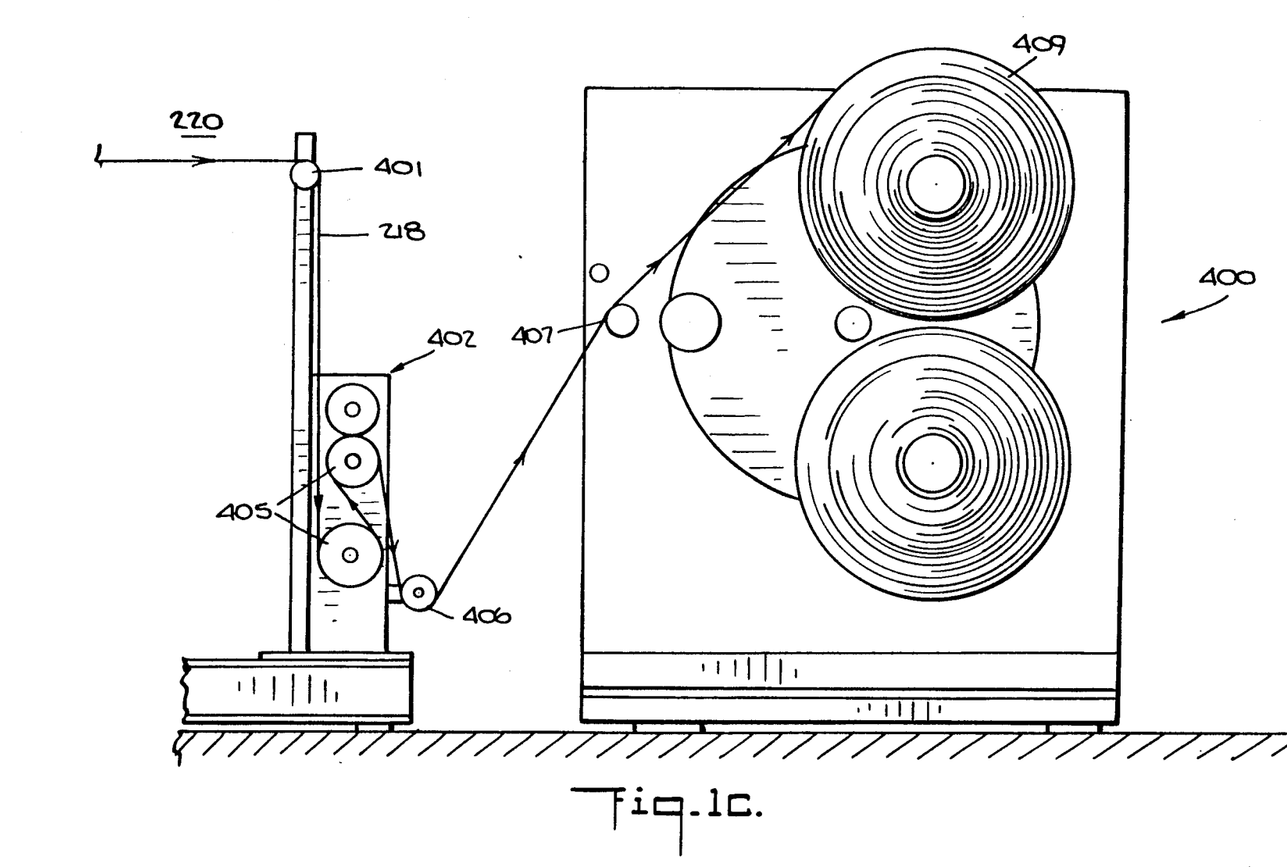

Thus, as shown in FIG. 1B, zipper strip 204 (as shown for example in FIGS. 2A, 2B and 2C) is unrolled from zipper supply roller 201 and fed toward zipper dancer assembly 205. Zipper dancer assembly 205 includes driven roller 206 whose rotation is controlled in accordance with master drive roller 210, in a manner to be described below. From driven roller 206, zipper strip 204 is led toward roller 207 and back toward roller 209. As shown in FIG. 1B, roller 209 is disposed at one end of pivot bar 211. The other end of pivot bar 211 has an adjustable weight 212. With this arrangement, the tension on zipper strip 204 may be adjusted as desired, and any irregularities in the feed speed of zipper strip 204 may be accommodated by the pivoting action of bar 211.

From roller 209, zipper strip 204 is led toward inserter 214, where it is inserted between the edges of folded thermoplastic sheet 105. As shown in more detail in FIG. 4A, inserter 214 includes a roller 215 rotatably mounted on guide 216. The roller is disposed between the two legs of folded thermoplastic material 105. Zipper strip 204 is fed around roller 215 and placed into the appropriate position in folded thermoplastic material 105. Through the cooperation of lateral adjuster 112 and the position of roller 215, the zipper strip 204 may be placed to any suitable position within the legs of folded thermoplastic material 105.

Figures 4A, 4B:
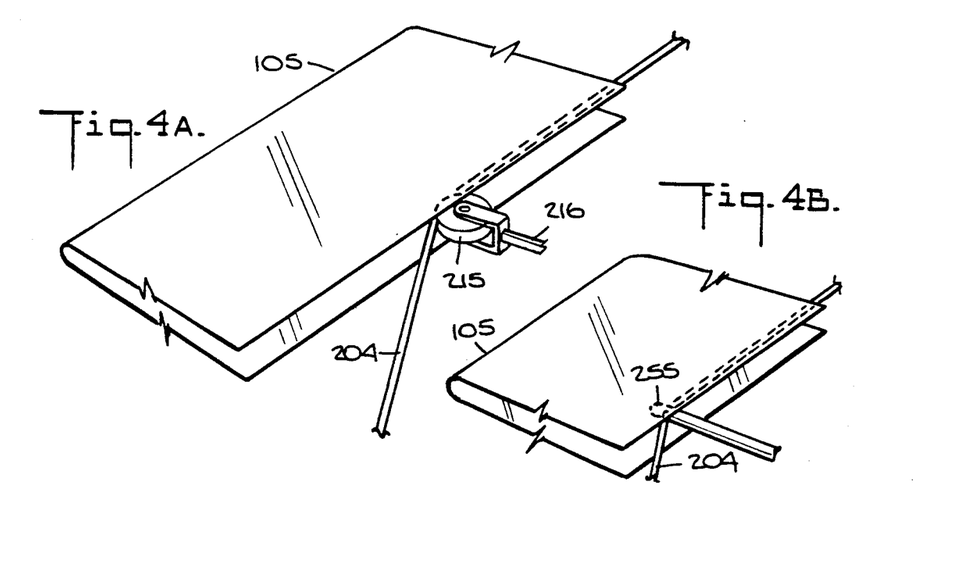
FIGS. 4A and 4B are detailed views of zipper inserters used in the FIG. 1 embodiment.

FIG. 4B shows a variation on inserter 214, in which the roller of FIG. 4A is replaced with a needle-like eye 255.

The entire assembly, that is, the folded thermoplastic material with inserted zipper strip 204, is drawn by master feed roller 210 into the main frame. Master feed roller 210 is the controlling drive force in the entire welding apparatus, and rotation of driven rollers 110, 206 and 405 (see below) is controlled based on the rotation of master feed roller 210.

The folded thermoplastic material/zipper strip assembly is then fed to welding section 300 where each half of zipper strip 204 is welded to its adjacent leg of the folded thermoplastic material 105. The detailed operation of welding section 300 is described below. For the present purposes, it is sufficient to note that the welding section includes a top laser 301 which projects a laser beam to a first welding station where the upper half of zipper strip 204 is welded to the upper leg of folded thermoplastic material 105, and a bottom laser 302 which projects a laser beam to a second welding station where the bottom half of zipper strip 204 is welded to the adjacent lower leg of folded thermoplastic material 105. These welds result in a fabricated web 218 such as that shown in FIG. 2, for use in the fabrication of resealable interlocking zipper strip bags.

If desired, Lasers 301 and 302 may be replaced with a single laser and a beam splitter. Also, it may be desirable to enclose the welding stations with an envelope of inert gas to prevent deterioration of the thermoplastic materials through oxidation or the like. In this, case, the welding stations may be surrounded by an enclosure through which the top or bottom laser beams may be projected. An inert gas, such as helium, would be pumped into the enclosure where it would be maintained at a positive pressure so as to ensure that atmospheric contaminants are excluded.

The fabricated web 218 is drawn out of welding station 300 across rollers 217 and 219 into a cooling area 220. The cooling area comprises an interface between main frame 200 and rewind assembly 400.

The Rewind Assembly

From main frame 200, the fabricated web 218 is drawn around roller 401 into tensioner 402. Similar to tensioner 109, tensioner 402 comprises three rollers in a vertical formation, around which the web 218 is wrapped in an S-shaped fashion. The lower rollers 405 are driven rollers which are driven in accordance with rotation of master feed roller 210, as described above. The web 218 is drawn around guide roller 406 and is led to reciprocating roller 407.

Roller 407 is of the type that reciprocates slowly in a lateral direction (into and out of the plane of the drawing) so as to offset the web 218 as it is rewound onto rewind roller 409. In this way, the web 218 is caused to lie flatly on the rewind roller without undue disruptions caused by the different thicknesses where the zipper strip is and is not present.

The Welding Section

Figure 5:
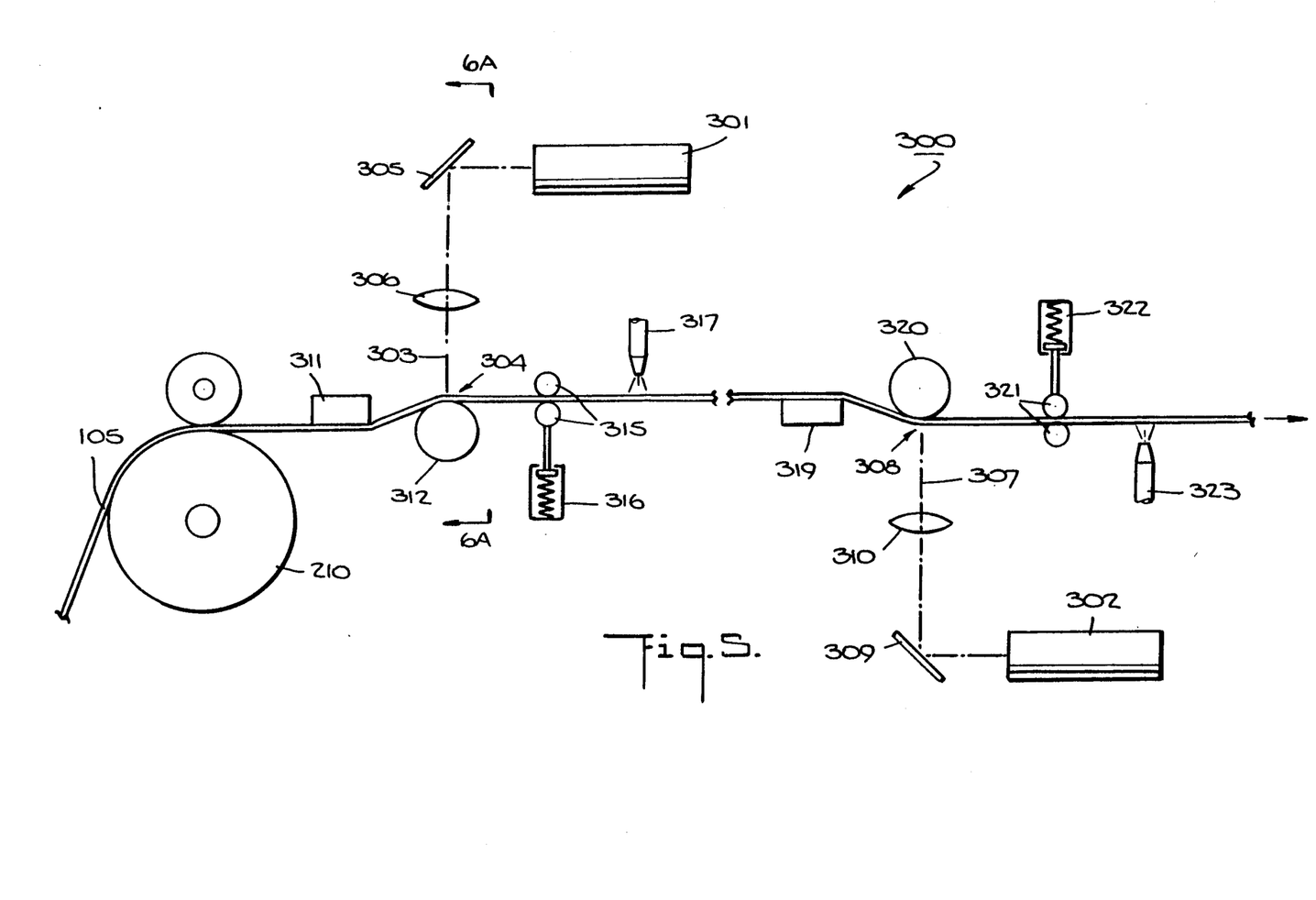
FIG. 5 is a detailed schematic of the welding section of the FIG. 1 embodiment.

FIG. 5 is a detailed schematic view of welding section 300. As shown in FIG. 5, welding section 300 includes top laser 301 which projects a first laser beam 303 to first welding station 304 along an optical path that includes deflection mirror 305 and focusing lens 306. Similarly, welding section 300 includes bottom laser 302 which projects a second laser beam 307 to a second welding station 308 along an optical path that includes deflection mirror 309 and focusing lens 310. It should be noted that the laser beams projected from lasers 301 and 302 are projected out of the plane of FIG. 1; the arrangement shown in FIG. 5 is merely to simplify explanation.

The lasers 301 and 302 are carbon dioxide ($CO_2$) lasers, which produce light are wavelength of 10.6 microns. Of course, other suitable laser sources may be substituted.

The folded thermoplastic sheet/zipper strip assembly is led from master feed roller 210 toward the lower surface of guide plate 311 and thence to the upper surface of guide wheel 312. It will be seen from FIG. 5 that the relative vertical position of guide plate 311 and guide wheel 312 is adjusted so that the folded thermoplastic material/zipper strip assembly is warped and tensioned in such a way as to cause close contact between the zipper strip and the folded thermoplastic material and to squeeze out of the assembly any residual air that was introduced at inserter station 214.

Figures 6A, 6B, 6C, 7:
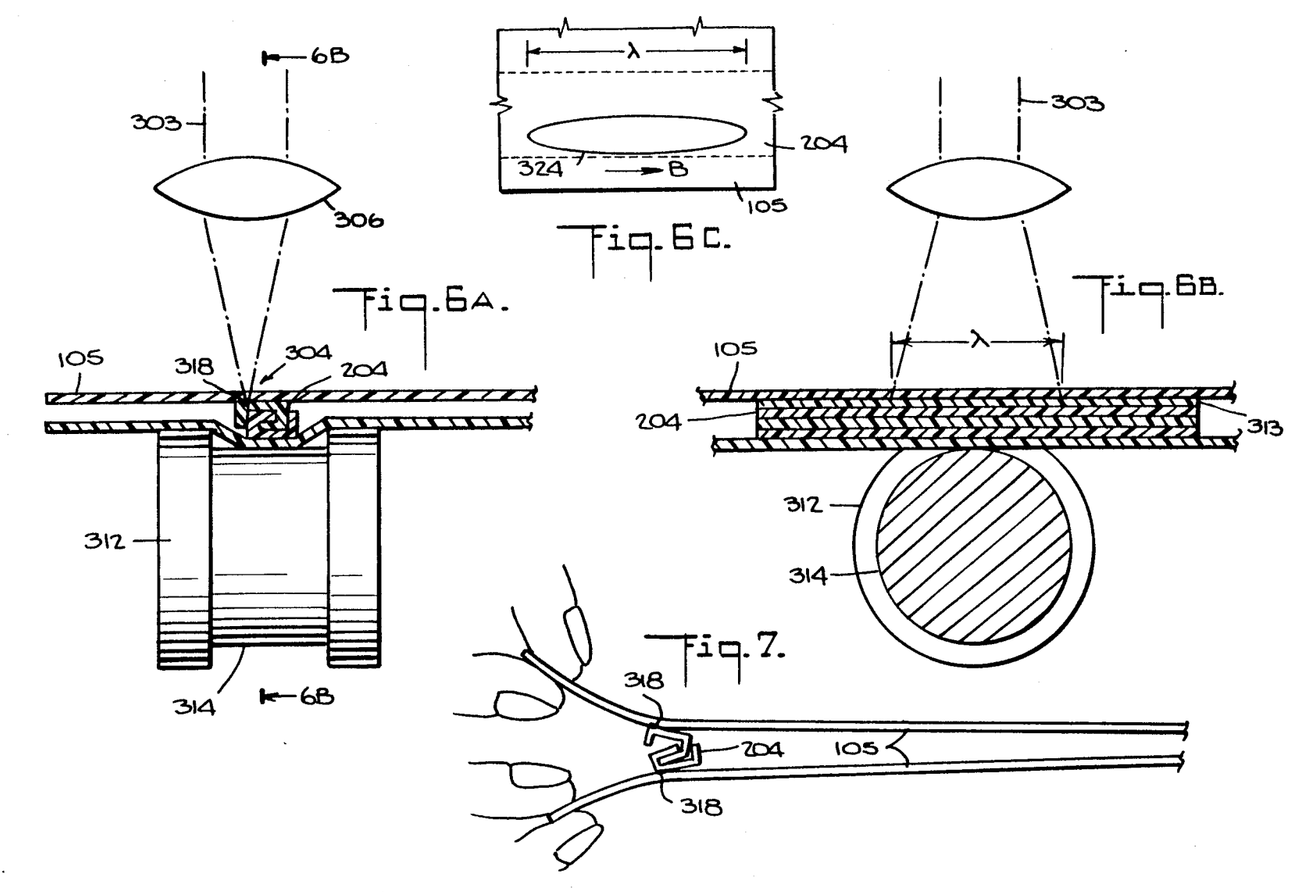
FIGS. 6A, 6B and 6C are views for explaining welding particulars.
FIG. 7 illustrates an opening operation.

Preferably, guide wheel 312 has groove 314 cut into the top surface thereof as shown in FIG. 6A. This groove is positioned to receive the bulge in folded thermoplastic sheet 105 that is caused by the presence of zipper strip 204. The groove also assists in positioning the zipper strip within the thermoplastic sheet so as to receive laser beam 303. If desired, guide plate 311 may be provided with a similar groove as a positioning aid.

As shown in FIG. 6A, laser beam 303 is projected at a position slightly offset from the center of groove 314. The offset is in the direction of the opening in U-shaped thermoplastic material 105. This forms a weld 318 at a position toward the eventual opening in the finished resealable bag and yields a more secure weld. Further, as shown in FIG. 7, when a consumer uses the finished bag, the offset position of the weld 318 assists in the opening operation since it causes the opening side of the zipper strip pair to be separated before the inside. This slight degree of additional leverage enhances the openability of the finished bag.

FIG. 6B is an exaggerated view at weld station 304 to show the proper focus for lens 306.

In the preferred embodiment, lens 306 (as well as lens 310) is a cylindrical lens which causes laser beam 303 to be focused into an elongated, generally ellipsoidal shape. FIG. 6C illustrates the focused shape of the laser beam. As shown there, the focused beam 324 is elongated in the feed direction B of the thermoplastic material by a beam elongation length $\lambda$. Coupled with the feed speed, the beam elongation length $\lambda$ defines the time during which any particular point on the thermoplastic material is irradiated by laser beam 303. Hereinafter, this time is referred to as the "dwell time". In accordance with the particular combination of machine and substrates, lens 306 may, instead, be a spot focus lens.

As shown in FIG. 6B, laser beam 303 should be focused by lens 306 at the junction 313 between the upper leg of folded thermoplastic material 105 and the top half of zipper strip 204. This position ensures that the energy of laser beam 303 is concentrated at the position where the weld should be formed.

As focused laser beam 303 traverses the thickness of the upper leg of folded thermoplastic sheet 105, energy is absorbed by the thermoplastic material, thereby causing the thermoplastic material to heat to the softening point. However, because of this energy absorption, less energy is available to heat the upper half of zipper strip 204 to its softening point. Accordingly, to ensure that a strong weld is formed, zipper strip 204 should be fabricated from a thermoplastic material having a softening temperature lower than that of the thermoplastic material from which folded thermoplastic sheet 105 is formed. While this can be achieved in a variety of ways known generally to those skilled in the manufacture of thermoplastic material, the embodiment herein uses the simple expedient of fabricating zipper strip 204 from the same material as folded thermoplastic sheet 105 but with the addition of between 0% and 20%, preferably 10%, by weight of ethyl vinyl acetate (EVA). Amounts higher than 20% EVA tend to weaken the zipper strip 204 unacceptably. For many applications, 10% EVA has been found to yield a softening temperature that has been lowered sufficiently so that after focused laser beam 303 has traversed thermoplastic sheet 105, the residual energy is sufficient to raise zipper strip 204 to its softening temperature. Consideration of the thickness, density, transparency and other physical properties of the material will yield the proper EVA content for other applications.

Preferably, long focus optics are used for lens 306. If short focus optics are used, it is difficult to adjust the focal point accurately. With long focus optics, errors in the focal point may more easily be corrected, thereby preventing the formation of unwanted welds, for example, a weld between the halves of the zipper strip. The focal length can, of course, be adjusted in accordance with the actual materials used.

Returning to FIG. 5, after laser beam 303 has raised the temperature of the upper leg of the folded thermoplastic sheet and the upper half of zipper strip 204 to their respective softening temperatures, the heated assembly passes from welding station 304 to the nip between pressure roller pair 315. The roller pair exerts pressure on the heated assembly to ensure that the heated parts are welded together. As shown in FIG. 5, the lower roller of pair 315 is connected to an adjustable spring force assembly 316 thereby providing the capability to adjust the pressure exerted by roller pair 315.

From pressure roller pair 315, the assembly is passed adjacent cooling apparatus 317 which cools the weld area. In FIG. 5, the cooling apparatus is shown simply as a jet of cool air.

From cooling apparatus 317, the partially-welded assembly is passed to a second welding position arranged longitudinally of the thermoplastic web, i.e., in a direction parallel to the feeding direction. The second welding position includes guide surface 319, guide roller 320, weld station 308, pressure roller pair 321 with associated adjustable spring force assembly 322 and cooling apparatus 323. Here, a similar weld is formed between the lower leg of thermoplastic sheet 105 and lower half of zipper strip 204. The arrangement of these components is the mirror image of that of the first weld station, and a detailed description thereof will be omitted in the interests of brevity.

After the lower weld has been cooled by cooling apparatus 323, the welded assembly (comprising fabricated web 218) is passed through rollers 217 and 219 toward cooling area 220, as discussed above in the section entitled "Main Frame".

Operation and Test Results

As is evident from the foregoing description, the apparatus described above has provisions for adjusting several parameters to achieve effective welds. For example, the speed may be adjusted by adjusting the speed of master feed roller 210, the power level of lasers 301 and 302 may be adjusted, the beam elongation λ and the size of the beam spot at the focus point may be adjusted through selection of the appropriate cylindrical lenses 306 and 310, the dwell time may be selected through coordinated selection of beam elongation and feed speed, the nip pressure between pressure roller pairs 315 and 321 may be adjusted using spring assemblies 316 and 322, respectively, and the relative tension between the folded thermoplastic sheet and the zipper strip may be adjusted through weight 212.

Several test runs were performed on the apparatus of FIG. 1 to determine appropriate settings for these parameters in order to achieve suitable welds. The results of these tests are summarized in the following Table. It should be understood, of course, that these tests are merely illustrative of the wide variety of appropriate settings that may be used to achieve effective welds. Other settings may be found through straight-forward adjustment of the parameters, which adjustment is well within the skill of the ordinary artisan in this field.

TABLE

| | | |
|---|---|---|
| Thickness of Thermoplastic Material 105 | 2-Mil (.002) | 4-Mil (.004) |
| Material Type | Low Density Polyethylene (LDPE) | LDPE |
| Speed (ft/min) | 125 | 100 |
| Laser Power Levels | 50 watts | 60 watts |
| Beam Elongation (λ) | 1" | 7/16" |
| Tension | Equilized web to zipper | |
| Nip pressure | 10-15 PSI | 10-15 PSI |
| Ethyl Vinyl Acetate Content Of Zipper Strip | 10% | 10% |

The tests run with the above apparatus show that reasonable changes from the above values are more-or-less proportionate. For example, laser power is proportionate to line speed. Doubling the laser power allows an approximate doubling of the speed (within ten or twenty percent).

Figure 8:
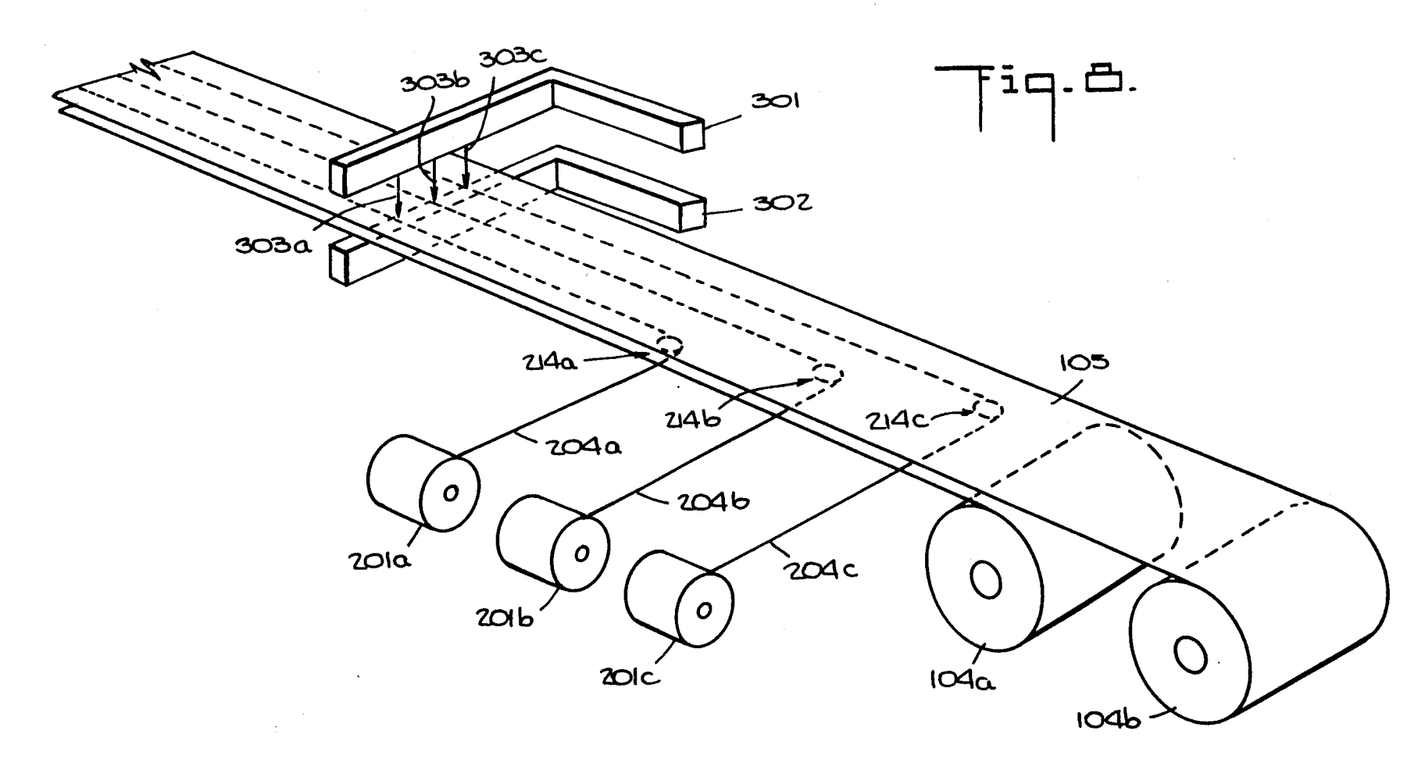
FIG. 8 is a schematic view illustrating multiple weld stations arranged laterally perpendicular to a feed direction of thermoplastic material.

The foregoing detailed description has been provided so that the nature of the invention may be understood by those skilled in the art. Modifications will be evident to those skilled in the art without departing from the spirit of the invention. For example, multiple weld stations may be arranged laterally of the thermoplastic web in a direction perpendicular to the feed direction, as shown schematically in FIG. 8.

Accordingly, the scope of the invention should be measured by reference to the appended claims.

We claim:
1. A welding method comprising the steps of:
    continuously feeding a first sheet of a first polyethylene material past a weld station;
    continuously feeding a second polyethylene material comprising EVA past a weld station to contact a first side of said polyethylene sheet at the weld station; and
    projecting a laser beam to the weld station from a second side of said polyethylene sheet opposite said first side thereof to weld said materials together, wherein said projecting step comprises focusing the laser beam through a lens system into a generally elliptical shape, as seen in a focal plane substantially coincident with a contact point between said first and second materials,
    said elliptical shape elongated in the feed direction of said first and second materials.

2. The welding method of claim 1, wherein said contacting step comprises relatively guiding said first and second materials past a groove in a grooved member.

3. The welding method of claim 1, wherein said contacting step comprises leading said first and second materials past a support plate and a guide wheel that are offset from one another in a direction longitudinally along a feed direction of said first and second materials in such a manner as to bring the materials into close contact with one another.

4. The welding method of claim 1, further comprising the step the step of laterally adjusting the position of said first material relative to the position of said second material.

5. The welding method of claim 1, wherein the second EVA polyethylene material is provided with between 0% and 20%, by weight, of EVA.

6. The welding method of claim 1, wherein the second EVA polyethylene material is provided with approximately 10%, by weight, of EVA.

7. The welding method of claim 1, wherein said first material is U-shaped, and said second material is an interlocking zipper strip, wherein said method further comprises the step of inserting said zipper strip between the legs of said U-shaped first material.

8. The welding method of claim 7, further comprising the step of projecting a plurality of laser beams through both legs of said U-shaped sheet of said first material.

9. The welding method of claim 7, wherein the weld station is offset toward the open end of said U-shaped first material.

* * * * *

UNITED STATES PATENT AND TRADEMARK OFFICE
CERTIFICATE OF CORRECTION

PATENT NO. : 5,279,693
DATED : January 18, 1994
INVENTOR(S) : John P. Robinson, et al It is certified that error appears in the above-indentified patent and that said Letters Patent is hereby corrected as shown below:

COLUMN 5

Line 66, "are" should read --at a--.

COLUMN 8

Line 47, "first" (1st ocurrence) should be deleted.

COLUMN 9

Line 8, "the step" (2nd occurrence) should be deleted.

Signed and Sealed this

Sixth Day of September, 1994

BRUCE LEHMAN

*Attest:*

*Attesting Officer*  *Commissioner of Patents and Trademarks*